Oct. 25, 1960 A. HAUGESTAD 2,957,958
BEARING WEAR INDICATING MEANS
Filed Feb. 17, 1959 2 Sheets-Sheet 1

INVENTOR.
ARNE HAUGESTAD
BY
McMorrow, Berman + Davidson
ATTORNEYS

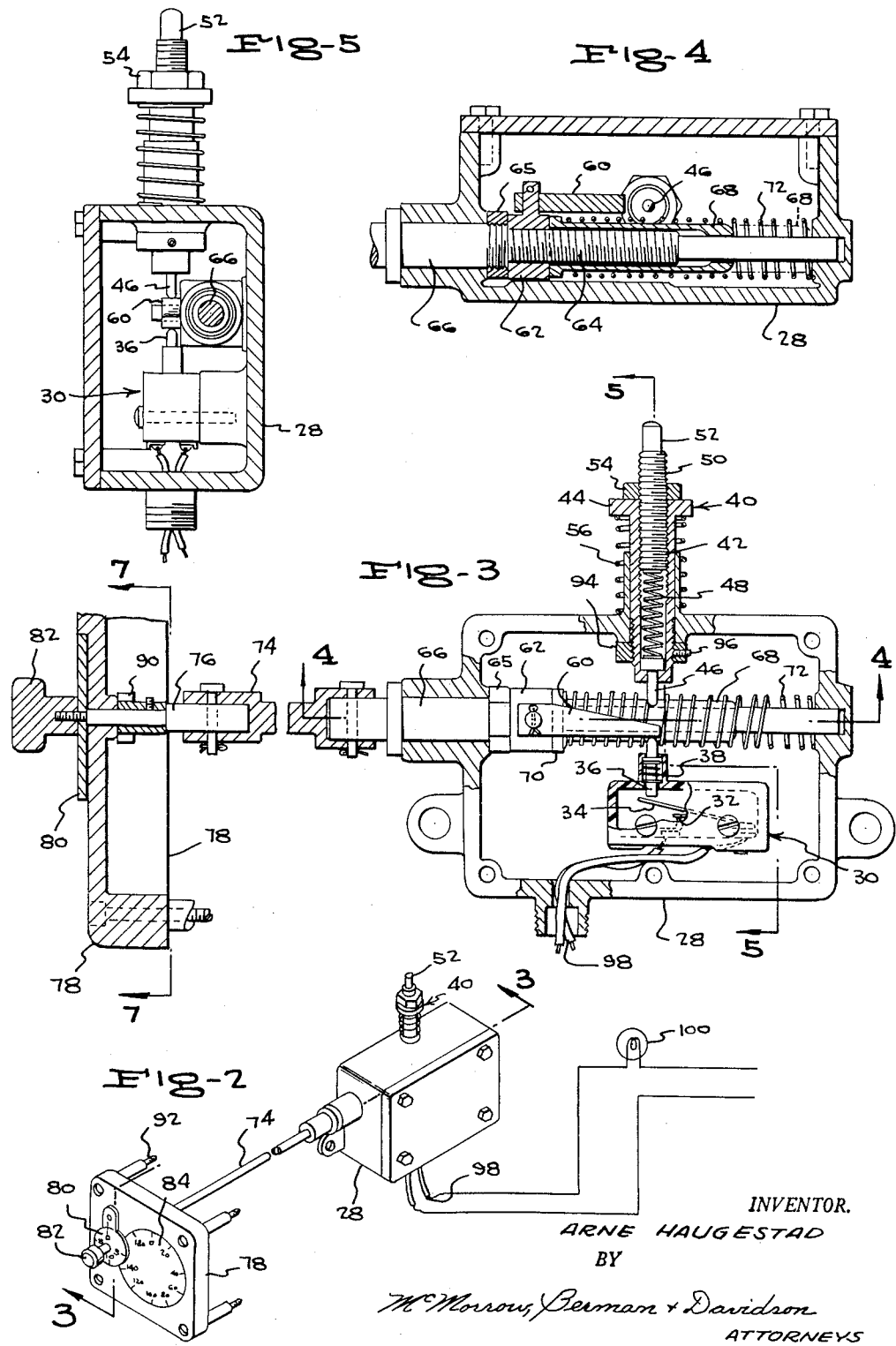

United States Patent Office 2,957,958
Patented Oct. 25, 1960

2,957,958

BEARING WEAR INDICATING MEANS

Arne Haugestad, 10 Clark Place, Tenafly, N.J.

Filed Feb. 17, 1959, Ser. No. 793,742

6 Claims. (Cl. 200—61.4)

The present invention relates to internal combustion engines generally and specifically to a means for detecting and indicating wear in a connecting rod bearing of an internal combustion engine, particularly a marine engine of the diesel type, although the invention may be employed in connection with any engine having a reciprocatory piston.

An object of the present invention is to provide a bearing wear indicating means for an internal combustion engine which lends itself to ready installation in an internal combustion engine having a reciprocatory piston and connecting rod, and one which may be adjusted to indicate wear in the bearing supporting the connecting rod, such bearing wear as little as five-one-thousands of an inch being detectable by the means of the present invention.

Another object of the present invention is to provide detecting and indicating means for wear in the bearing of a connecting rod of an internal combustion engine which lends itself to fine adjustment with the engine in operation and having a relatively high operating temperature.

A further object of the present invention is to provide a means for detecting and indicating wear in a connecting rod bearing of an internal combustion engine which is simple in structure, one sturdily constructed and having relatively long-life characteristics, one economical to manufacture and assemble, and one which is highly effective in action.

These and other objects and advantages of the present invention will be fully apparent from the following description when taken in conjunction with the annexed drawings, in which:

Figure 2 is an isometric view of the indicating means of the present invention, the electric circuit of the means being shown schematically;

Figure 3 is a view on an enlarged scale, taken on the line 3—3 of Figure 2, with a portion of the shaft broken away;

Figure 4 is a view taken on the line 4—4 of Figure 3;

Figure 5 is a view taken on the line 5—5 of Figure 3;

Marine propulsion engines of the two cycle diesel type have connecting rod bearings which may become worn to the extent that the crankshaft journal is damaged without audible warning due to the fact that the piston carried by the connecting rod is under pressure at all times and the knocking noise normally indicating wear in a connecting rod bearing of a four cycle internal combustion engine is not apparent in a two cycle diesel engine. The bearings in a diesel engine by means of which the connecting rods are connected to the crankshaft may become worn to the point of failure before an operator of the engine is informed of any bearing wear.

Figure 1:
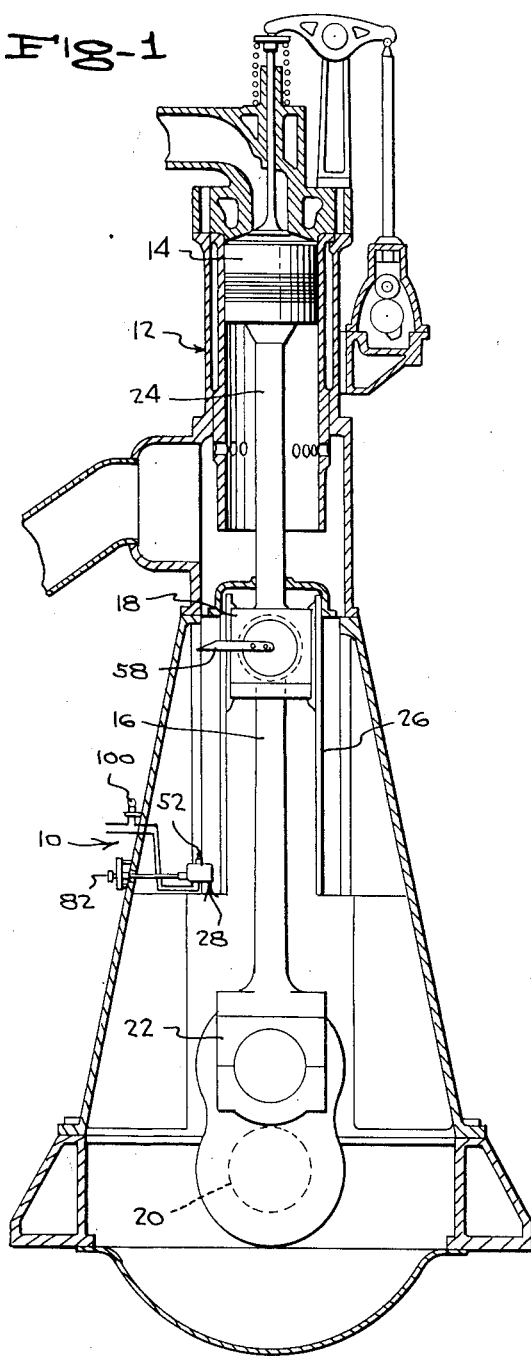
Figure 1 is a sectional view of an internal combustion engine of the diesel type commonly used for marine propulsion, with the bearing wear detecting and indicating means of the present invention installed therein.
Figure 6:
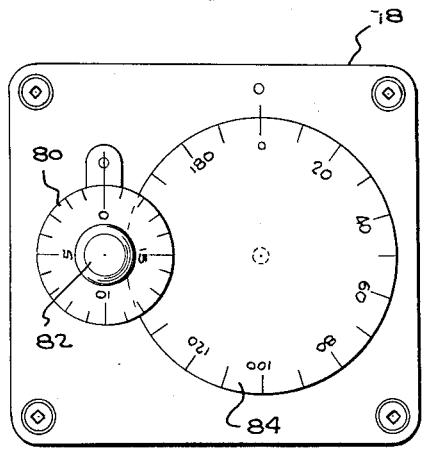
Figure 6 is a front view of the dials employed with the bearing wear detecting and indicating means of the present invention.

The means for indicating the wear of a bearing in an internal combustion engine according to the present invention is designated by the numeral 10 in Figure 1 in which the reference numeral 12 designates generally a diesel engine having a piston 14, a connecting rod 16, a crosshead 18, a crankshaft 20, and a connecting rod bearing assembly 22.

The connecting rod 16 connects the crosshead 18 to a journal of the crankshaft 20 and a piston rod 24 connects the crosshead 18 with the piston 14. The crosshead 18 is slidable upwardly and downwardly in a guideway 26 supported on the wall of the engine 12.

The means 10 for indicating the wear of the bearing within the bearing assembly 22 comprises a housing 28 fixedly supported within the crankcase of the engine 12 on a portion of the guideway 26. The housing 28 is oil-tight and has within it a microswitch assembly 30 including a fixed contact 32 and a movable contact 34 normally in open position with respect to the contact 32.

The microswitch assembly 30 includes an actuating member in the form of a plunger 36 biased outwardly of the assembly 30 by means of a spring 38 circumposed about it. The plunger 36 has the end within the housing of the assembly 30 movable into and out of engagement with the switch movable contact 34 in response to pressure applied to the other end.

Mounted upo the housing 28 is another actuating member or plunger 40 in spaced alignment with respect to the plunger 36 and movable toward and away from the plunger 36. The plunger 40 consists in a cup element 42 and a shoulder 44 at its upper end. The element 42 has an actuating pin 46 projecting outwardly of the opening in its lower end. A coil spring 48 is positioned within the cup element 42 and has one end bearing on the upper end of the pin 46 and the other end bearing against the bottom of a screw member 50 having external threads in threaded engagement with internal threads on the cup element 42. The screw element 50 has an upper end portion 52 of reduced diameter and a lock nut 54 is in threaded engagement with the portion of the screw element 50 below the portion 52. A coil spring 56 is circumposed about the cup element 42 below the shoulder 44 and has one end bearing against the shoulder 44 and the other end bearing against the adjacent portion of the housing 28.

The spring 56 constitutes means biasing the plunger 40 to the position away from the plunger 36.

A finger 58 projects laterally from the crosshead 18 at a point spaced above the bearing of the bearing assembly 22 and is cooperatively disposed with respect to the projecting end portion 52 of the screw element 50 carried by the housing 28. The finger 58 is operatively connected to the connecting rod 16 and is carried upwardly and downwardly in response to the reciprocatory movement of the crosshead 18.

Means is provided projectable and retractable between the plunger 36 and the pin 46 for setting the degree of relative movement of the actuating members which constitute the plunger 36 and plunger 40. Specifically, this means consists in a wedge element 60 pivotally connected to a nut element 62 threadedly engaged on a screw portion 64 of the shaft 66 which extends transversely of the housing 28 and is rotatably supported therein.

A sleeve 68 is slidably mounted upon the portion of the shaft 66 within the housing 28 and has a shoulder 70 at one end frictionally engaging the adjacent face of the nut element 62. The coil spring 72 is circumposed about the sleeve 68 and the portion of the shaft 66 exteriorly of the sleeve 68 and has one end bearing against the interior wall of the housing 28 and the other end bearing against the shoulder 70. The spring 72 takes up all the slack in the connection of the nut element 62 to the shaft 66.

The shaft 66 has a portion adjacent one end projecting exteriorly of the housing 28 and connected by means of a connector member 74 to a shaft element 76 projecting out of the rear face of an indicator housing 78.

The shaft element 76 carries a dial 80 having indicia thereon cooperating with fixed indicia on the front face of the indicator housing 78. A knob 82 is operatively connected to the dial 80 and constitutes hand actuable means for effecting the rotation of the shaft element 76, connector member 74, and the shaft 66 which carries the nut element 62.

Figure 7:
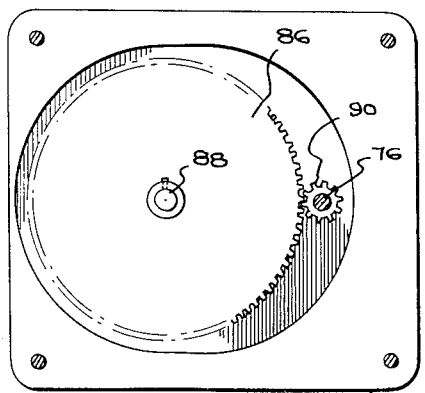
Figure 7 is a view taken on the line 7—7 of Figure 3.

Another dial 84 is mounted for rotation on the housing 78. As shown in Figure 7, a large gear 86 is carried by the shaft portion 88 which carries the dial 84 and the shaft element 76 carries another gear 90. The ratio of teeth between the gears 86 and 90 is predetermined, for instance, ten to one.

Bolts 92 may be employed to support the indicator housing 78 on the exterior of the crankcase of the engine 12.

Referring to Figure 3, a nut 94 is threadedly engaged with the lower end portion of the cup element 42 within the housing 28 and a set screw 96 is employed to secure the nut 94 at a selected position of adjustment on the cup element 42.

Wires, as at 98 in Figure 3, connect the fixed and movable contacts 32 and 34 of the switch assembly 30 to a source of power and to a signal light 100.

In operation, before the housing 28 is installed in an engine, the shaft 66 is rotated so as to shift the wedge element 60 to a position in which its highest point may be contacted by the free end of the pin 46. The cup element 42 is moved upwardly or downwardly against the tension of the spring 56 until the free end of the pin 46 touches the highest point of the wedge element 60. The nut 94 is then tightened on the cup element 42 and the set screw 96 is tightened to secure the nut 94. The housing 28 is then installed in the engine and secured to the guideway 26.

Next, the knob 82 is rotated by hand in the counterclockwise direction until it stops by engagement of the sleeve 68 with the inner surface of the housing 28, as shown in dotted lines in Figure 4. The knob 82 is next turned in clockwise direction until the nut element 62 engages a collar 65 on the shaft 66. The engine crankshaft 20 is now turned to bottom dead center effecting the engagement of the finger 58 with the free end of the portion 52 of the screw element 50 to depress the screw element 50 and the attached cup element 42 against the resistance of the spring 56.

Next, the screw element 50 is rotated so as to be adjusted upwardly relatively with respect to the cup element 42 until the pin 46 of the plunger 40 bears down on the wedge element 60 and causes the latter to shift the microswitch plunger 36 downwardly to the point at which the contact 34 closes on the contact 32. This results in the energization of the light 100. Now the knob 82 is manually rotated clockwise one full turn which retracts the nut element 62 on the screw portion 64 of the shaft 66 and shifts the wedge element 60 so that a predetermined clearance is obtained between the free end of the pin 46 and the adjacent part of the upper surface of the wedge element 60, .020 of an inch, for example.

As the engine 12 warms up, the piston rod 24 and connecting rod 16 change in length due to expansion and it may be necessary to turn the knob 82 to retract the wedge element 60 a distance sufficient to permit expansion of the components of the engine 12 without effecting the movement of the plunger 36 of the switch assembly 30. Now, with the pin 46 adjusted in spaced relation with respect to the plunger 36, any undue wear to the bearing of the bearing assembly 22 will result in engagement of the finger 58 with the plunger 40 to effect the taking up of this predetermined clearance between the upper surface of the wedge element 60 and the pin 46 and result in the closing of the contacts 32 and 34 together to illuminate the light 100, thereby indicating that the bearing of the bearing assembly 22 has worn and that attention to the repair of the bearing is necessary.

Preferably, the dials 80 and 84 are graduated in indicia related to the extension and retraction movement of the wedge element 62 and the sloping face of the wedge element 62 is so milled that for each turn of the knob 82, the wedge element 60 is shifted to provide a predetermined clearance with respect to the pin 46. Upon wear of the crankshaft bearing to the limit of this clearance, the dials 84 and 80 will register the thickness of the bearing material worn away.

What is claimed is:

1. In combination with a rotatable crankshaft, a bearing on said crankshaft, and a connecting rod having one end supported on said bearing, a means for indicating the wear of said bearing comprising a switch including a fixed contact and a movable contact normally in open position with respect to said fixed contact, a first actuating member movable into and out of engagement with respect to said switch movable contact, a second actuating member in spaced alignment with said first actuating member and movable toward and away from said first actuating member, a finger projecting laterally from said rod at a point spaced above said bearing and cooperatively disposed with respect to said second actuating member, and hand actuable means for setting the degree of relative movement of said first and second actuating members, said finger contacting said second actuating member upon wear of said bearing corresponding to the setting of the relative movement between said first and second members to actuate said first member to shift said movable contact into closed position with respect to said fixed contact.

2. In combination with a rotatable crankshaft, a bearing on said crankshaft, and a connecting rod having one end supported on said bearing, a means for indicating the wear of said bearing comprising a switch including a fixed contact and a movable contact normally in open position with respect to said fixed contact, a first actuating member movable into and out of engagement with respect to said switch movable contact, a second actuating member in spaced alignment with said first actuating member, a finger projecting laterally from said rod at a point spaced above said bearing and cooperatively disposed with respect to said second actuating member, and means projectable and retractable between said first and second members for setting the degree of relative movement of said first and second actuating members, said finger contacting said second actuating member upon wear of said bearing corresponding to the setting of the relative movement between said first and second members to actuate said first member to shift said movable contact into closed position with respect to said fixed contact.

3. In combination with a rotatable crankshaft, a bearing on said crankshaft, and a connecting rod having one end supported on said bearing, a means for indicating the wear of said bearing comprising a switch including a fixed contact and a movable contact normally in open position with respect to said fixed contact, a first actuating member embodying a first plunger movable into and out of engagement with respect to said switch movable contact, a second actuating member embodying a second plunger in spaced alignment with said first plunger and movable toward and away from said first plunger, a finger projecting laterally from said rod at a point spaced above said bearing and cooperatively disposed with respect to said second plunger, and means embodying a wedge element projectable and retractable between said first and second plungers for setting the degree of relative movement of said first and second plungers, said finger contacting said second plunger upon wear of said bearing corresponding to the setting of the relative movement between said first and second plungers to actuate said first plunger to shift said movable contact into closed position with respect to said fixed contact.

4. In combination with a rotatable crankshaft, a bearing on said crankshaft, and a connecting rod having one end supported on said bearing, a means for indicating the wear of said bearing comprising a switch including a fixed contact and a movable contact normally in open position with respect to said fixed contact, a first actuating member embodying a first plunger movable into and out of engagement with respect to said switch movable contact, a second actuating member embodying a second plunger in spaced alignment with said first plunger and movable toward and away from said first plunger, spring means operatively connected to said second plunger for biasing it away from said first plunger, a finger projecting laterally from said rod at a point spaced above said bearing and cooperatively disposed with respect to said second plunger, and means embodying a wedge element projectable and retractable between said first and second plungers for setting the degree of relative movement of said first and second plungers, said finger contacting said second plunger upon wear of said bearing corresponding to the setting of the relative movement between said first and second plungers to actuate said first plunger to shift said movable contact into closed position with respect to said fixed contact.

5. In combination with a rotatable crankshaft, a bearing on said crankshaft, and a connecting rod having one end supported on said bearing, a means for indicating the wear of said bearing comprising a switch including a fixed contact and a movable contact normally in open position with respect to said fixed contact, a first actuating member embodying a first plunger movable into and out of engagement with respect to said switch movable contact, a second actuating member embodying a second plunger in spaced alignment with said first plunger and movable toward and away from said first plunger, a finger projecting laterally from said rod at a point spaced above said bearing and cooperatively disposed with respect to said second plunger, a rotatable shaft positioned so that the portion adjacent one end is transversely of and adjacent said first and second plungers, a wedge element carried by said one end of said shaft for projectile and retractile movement between said first and second plungers responsive to rotation of said shaft, and hand actuable means operatively connected to said shaft for effecting the rotation of said shaft and shifting of said wedge element for setting of the degree of relative movement of said first and second plungers, said finger contacting said second plunger upon wear of said bearing corresponding to the setting of the relative movement between said first and second plungers to actuate said first plunger to shift said movable contact into closed position with respect to said fixed contact.

6. In combination with a rotatable crankshaft, a bearing on said crankshaft, and a connecting rod having one end supported on said bearing, a means for indicating the wear of said bearing comprising a switch including a fixed contact and a movable contact normally in open position with respect to said fixed contact, a first actuating member embodying a first plunger movable into and out of engagement with respect to said switch movable contact, a second actuating member embodying a second plunger in spaced alignment with said first plunger and movable toward and away from said first plunger, a finger projecting laterally from said rod at a point spaced spaced above said bearing and cooperatively disposed with respect to said second plunger, a rotatable shaft positioned so that the portion adjacent one end is transversely of and adjacent said first and second plungers, a wedge element carried by said one end of said shaft for projectile and retractile movement between said first and second plungers responsive to rotation of said shaft, a first dial carried by the other end of said shaft for rotation therewith, a second dial positioned adjacent said first dial, gear means connecting said first dial for rotation with said second dial, and hand actuable means operatively connected to said first dial for effecting the rotation of said shaft and shifting of said wedge element for setting of the degree of relative movement of said first and second plungers, said finger contacting said second plunger upon wear of said bearing corresponding to the setting of the relative movement between said first and second plungers to actuate said first plunger to shift said movable contact into closed position with respect to said fixed contact.

References Cited in the file of this patent
UNITED STATES PATENTS 1,788,941    Bradley et al. _____ Jan. 13, 1931